United States Patent
Miller et al.

(10) Patent No.: US 9,940,446 B2
(45) Date of Patent: Apr. 10, 2018

(54) ANTI-PIRACY PROTECTION FOR SOFTWARE

(71) Applicant: Siemens Healthcare Diagnostics Inc., Tarrytown, NY (US)

(72) Inventors: Kerry L. Miller, Elkton, MD (US); Bestin Abraham, Newark, DE (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 181 days.

(21) Appl. No.: 14/904,166

(22) PCT Filed: Jul. 24, 2014

(86) PCT No.: PCT/US2014/047932
§ 371 (c)(1),
(2) Date: Jan. 11, 2016

(87) PCT Pub. No.: WO2015/013474
PCT Pub. Date: Jan. 29, 2015

(65) Prior Publication Data
US 2016/0147981 A1    May 26, 2016

Related U.S. Application Data

(60) Provisional application No. 61/858,209, filed on Jul. 25, 2013.

(51) Int. Cl.
*G06F 21/12* (2013.01)
*G06F 21/57* (2013.01)
(Continued)

(52) U.S. Cl.
CPC .............. *G06F 21/12* (2013.01); *G06F 21/10* (2013.01); *G06F 21/33* (2013.01); *G06F 21/57* (2013.01);
(Continued)

(58) Field of Classification Search
CPC .. G06F 21/12; G06F 21/57; G06F 2221/0704; G06F 2221/033; G06F 21/10;
(Continued)

(56) References Cited

U.S. PATENT DOCUMENTS

| 5,850,443 A | 12/1998 | Van Oorschot et al. |
| 6,243,468 B1 | 6/2001 | Pearce et al. |

(Continued)

FOREIGN PATENT DOCUMENTS

EP   2278520   1/2011

OTHER PUBLICATIONS

How are Software License Keys generated?, http://stackoverflow.com/questions/3002067/how-are-software-license-keys-generated, Jul. 10, 2014.

(Continued)

*Primary Examiner* — Catherine B Thiaw (57) ABSTRACT

A certificate for a target device includes encrypted system attributes that are verified against attributes of the target device prior to software usage. A certificate server securely obtains system attributes from the target system and generates a certificate with encrypted components including some system attributes. The certificate is stored on the target device and software installation/execution is made dependent on validation of the certificate. An encrypted system fingerprint in the certificate is decrypted by the software at the target device and compared with locally obtained system attributes to verify authorization for software usage on the target device. The certificate represents an easy to use paradigm for anti-piracy protection of software.

20 Claims, 4 Drawing Sheets (51) Int. Cl.
*G06F 21/10* (2013.01)
*H04L 9/32* (2006.01)
*G06F 21/33* (2013.01)
*H04L 29/06* (2006.01)

(52) U.S. Cl.
CPC ......... *H04L 9/3247* (2013.01); *H04L 9/3268* (2013.01); *H04L 63/0428* (2013.01); *G06F 2221/033* (2013.01); *G06F 2221/0704* (2013.01); *G06F 2221/0777* (2013.01)

(58) Field of Classification Search
CPC ............. G06F 21/33; G06F 2221/0777; H04L 9/3268; H04L 9/3247; H04L 63/0428
See application file for complete search history.

(56) References Cited

U.S. PATENT DOCUMENTS

| | | | |
|---|---|---|---|
| 6,427,091 B1 | 7/2002 | Davis et al. | |
| 6,460,023 B1 | 10/2002 | Bean et al. | |
| 6,463,535 B1 | 10/2002 | Drews | |
| 6,931,545 B1 | 8/2005 | Ta et al. | |
| 7,234,636 B1 | 6/2007 | Brausch et al. | |
| 7,313,828 B2 | 12/2007 | Holopainen | |
| 7,747,851 B1 | 6/2010 | Robinson et al. | |
| 7,788,181 B2 | 8/2010 | Ben-Menahem et al. | |
| 7,805,755 B2 | 9/2010 | Brown et al. | |
| 7,900,243 B2 | 3/2011 | Ramakrishna et al. | |
| 8,041,957 B2 | 10/2011 | Michaelis et al. | |
| 8,044,957 B2 | 10/2011 | Lake et al. | |
| 8,189,788 B2 | 5/2012 | Narendra et al. | |
| 8,438,394 B2 | 5/2013 | Etchegoyen et al. | |
| 8,620,818 B2 | 12/2013 | Hughes et al. | |
| 2003/0149670 A1 | 8/2003 | Cronce | |
| 2005/0182732 A1 | 8/2005 | Miller et al. | |
| 2006/0006475 A1 | 3/2006 | Elbert | |
| 2006/0085351 A1* | 4/2006 | Hug | G06F 21/10 705/59 |
| 2011/0026714 A1 | 2/2011 | Thomas et al. | |
| 2011/0099367 A1* | 4/2011 | Thom | H04L 9/0877 713/156 |
| 2011/0271344 A1* | 11/2011 | Unagami | G06F 21/554 726/23 |
| 2013/0086557 A1 | 4/2013 | Alwar et al. | |
| 2013/0091353 A1* | 4/2013 | Zhang | H04L 9/3268 713/156 |
| 2013/0151861 A1 | 6/2013 | Gan | |
| 2013/0318357 A1* | 11/2013 | Abraham | G06F 21/57 713/176 |
| 2014/0019955 A1* | 1/2014 | Summerer | G06F 21/57 717/171 |
| 2014/0351578 A1* | 11/2014 | Ekberg | G06F 21/572 713/156 |

OTHER PUBLICATIONS

Thompson et al., Certificate-based Access Control for Widely Distributed Resources, USENIX, (199).
International Search Report for PCT/US204/047932 dated Nov. 18, 2014.

* cited by examiner

ANTI-PIRACY PROTECTION FOR SOFTWARE

STATEMENT REGARDING FEDERALLY SPONSORED RESEARCH OR DEVELOPMENT

N/A

BACKGROUND OF THE INVENTION

Preventing unauthorized copying and/or use of software is an ongoing challenge. Various techniques have been developed to attempt to thwart unauthorized copying and/or use of software, including hardware keys, physically secure platforms and hardware, which are intended to prevent access to the software without authorization manifested in the form of a physical device, such as a key. Software authorizations have also been employed, including secure key codes, encryption and authentication protocols, such as user logins.

When a software platform is connected to a network, including public networks, such as a publically switched telephone network (PSTN) or internet, software can be downloaded to the platform for execution. It is often challenging to establish security for installation of software over such networks, or prevent execution of such software by unauthorized parties. Another concern with network distributed software is the possibility of unauthorized parties reverse engineering the software to determine software functionality. For example, a competitor of an entity that produces software may wish to reverse engineer the entity's software, to be able to develop competing products that can operate on the entity's platforms. While some safeguards are available to prevent unauthorized installation and/or copying, such as those mentioned above, challenges remain to prevent unauthorized software downloads, copying or execution. For example, some software may run in an unprotected simulation mode, which may permit unsecured access to the software.

BRIEF SUMMARY OF THE INVENTION

According to the present disclosure, a secure software installation and/or execution mechanism is provided. In some aspects, the disclosure provides a certificate that is created based on unique characteristics of a digital device that can accept and execute programming. The certificate is created based on unique characteristics of the device that are used to generate a system finger print, which can be maintained in an encrypted state. Upon software usage, e.g., installation, removal and/or execution, the presence of the certificate is verified, and the contents of the certificate are decrypted and inspected to verify authorized use. According to some aspects, the certificate is stored on the device for software usage. The software usage can be undertaken using an external hardware device, such as may be attached to an input/output port of the device. Examples of the external hardware device include serial or parallel port-connectable devices, USB type devices, such as USB flash drives, as well as any other portable, connectable hardware devices that can store software. The software usage can also be obtained through a network connected to the device, including LANs, WANs, intranets and internets, which can be connected to the device through wireless or hard wired connections, which include electrical, electromagnetic and optical connections. The software usage can also be provided via internal or external storage, including fixed or removable drives or memory storage.

According to some aspects, the software includes a utility that, upon usage, searches for the certificate, which can be located at a specific location in the device. If the utility locates the certificate, for example, at the specified location in the device, the software usage can proceed, while a failure to locate the certificate, for example, at the specified location, causes the utility to terminate the software usage.

According to an aspect of the present disclosure, a certificate is generated by collecting system information and generating a unique fingerprint from the collected system information. Such system information can include processor serial number, mainboard ID string, chipset information, hard drive serial number, MAC address, IP address, computer name, TCP/IP stack fingerprint, operating system characteristics such as version number and product key, and other hardware- or software-based values that can contribute to uniquely identifying the device.

Alternatively, or in addition to using target system characteristics in fingerprint generation, the unique fingerprint may be used to identify characteristics of other systems the target system is connected to or other aspects of the network environment of which the target system is a part. This can include characteristics of other systems in the same network, subnet, work group, domain, cluster, enclave, etc., as the target system or characteristics of the network itself. Such characteristics can include, with respect to the non-target systems, processor serial number, mainboard ID string, chipset information, hard drive serial number, MAC address, IP address, computer name, TCP/IP stack fingerprint, operating system characteristics such as version number and product key, etc. Further, software modules running on systems within the same network, subnet, work group, domain, cluster, enclave, etc., as the target system can be identified by the certificate analysis utility and polled or otherwise examined for module type or version number, and such software modules may also provide hardware-based or other software-based values for uniquely identifying the respective systems to the utility.

The system information, in addition to being used to generate a fingerprint, can also be used to ensure that the computer device hardware is appropriate for the software usage intended for the computer device. By using system information that is highly unique to the computer device, the probability of matching the fingerprint with another computer system is relatively small.

According to an aspect, a fingerprint for a computer system is used to generate a certificate for the computer system. According to some aspects, the system information, as described above, is collected at the computer system and encrypted for transmission to a certificate server, where a certificate is generated. The encryption process for encrypting the system information involves a symmetrical key used to encrypt and decrypt the system information. The symmetrical key is itself encrypted using a public key of an asymmetrical public/private key pair to create a session key. The encrypted system information and the session key are transmitted to the certificate server, where the system information is retrieved for creation of a certificate.

According to some aspects, the certificate server decrypts the session key using the private key of the asymmetrical public/private key pair that was used to generate the session key. The resulting symmetrical key is used to decrypt the system information obtained from the computer system. The system information is stored in a database on the certificate server. The system information is analyzed to determine that the system hardware is appropriate for the intended software product. The system information is further analyzed for unique characteristics to generate a system fingerprint. The certificate server then generates a certificate with a number of components. One component is the system fingerprint, encrypted with a symmetrical key. Another component is a session key, resulting from encrypting the symmetrical key with the public key of an asymmetrical public/private key pair. Another component is a digital signature, generated by encrypting the session key with a private key of a second asymmetrical public/private key pair. The digital signature, session key and encrypted system fingerprint information are stored in a certificate, which is transmitted to the computer system. According to some aspects, the certificate maybe stored in a particular location on the computer system.

According to some aspects of the present disclosure, software that is to be used on the computer system is first validated through the certificate on the computer system. Usage, e.g., installation, removal and/or execution, of the desired software causes a search to be undertaken for the certificate. If the certificate is not found, usage terminates. If the certificate is located, the digital signature, session key and encrypted system fingerprint are extracted and used to verify a match with the credentials and computer system on which the software is to be used. Any discrepancies between the certificate component values and computer system attributes results in termination of the process.

According to some aspects of the present disclosure, the certificate is created by a certificate server using a network connection with the computer system. Once the certificate is generated and provided to the computer system, a network connection is unnecessary for use of the certificate and can be removed. The certificate server holds the public/private key pair used to create the session key in the certificate, and also holds the public/private key pair used to create the digital signature in the certificate. The certificate also holds one or more symmetrical keys used to encrypt the system information and/or the system fingerprint.

According to some aspects of the present disclosure, software products distributed in accordance with the present disclosure include encryption keys and logic to access the system fingerprint in the certificate and evaluate the system fingerprint against the computer system in which the software product is to be used. According to some aspects, the system fingerprint is created using tagged values to permit specific matching against computer system attributes. The distributed software product operates by verifying the presence of a certificate, using a public key to verify the digital signature and then using a private key to decrypt the session key, followed by using the decrypted session key to access the system fingerprint.

The system information, system fingerprint and/or certificate may be in the form of an XML document, organized with the tagged values. An XML document housing the system fingerprint is encrypted with the symmetric key to form one of the components of the certificate.

BRIEF DESCRIPTION OF THE SEVERAL VIEWS OF THE DRAWINGS

The present disclosure is described in greater detail below, with reference to the accompanying drawings, in which.

DETAILED DESCRIPTION OF THE INVENTION

Authorization for a particular computer system to install, remove and/or execute (use) a software product is provided through a certificate on the computer system with encrypted system details that are decrypted and compared against attributes of the computer system. When the encrypted system details match the corresponding attribute data of the computer system, the computer system is considered to be authorized for use with the software product.

Figure 1:
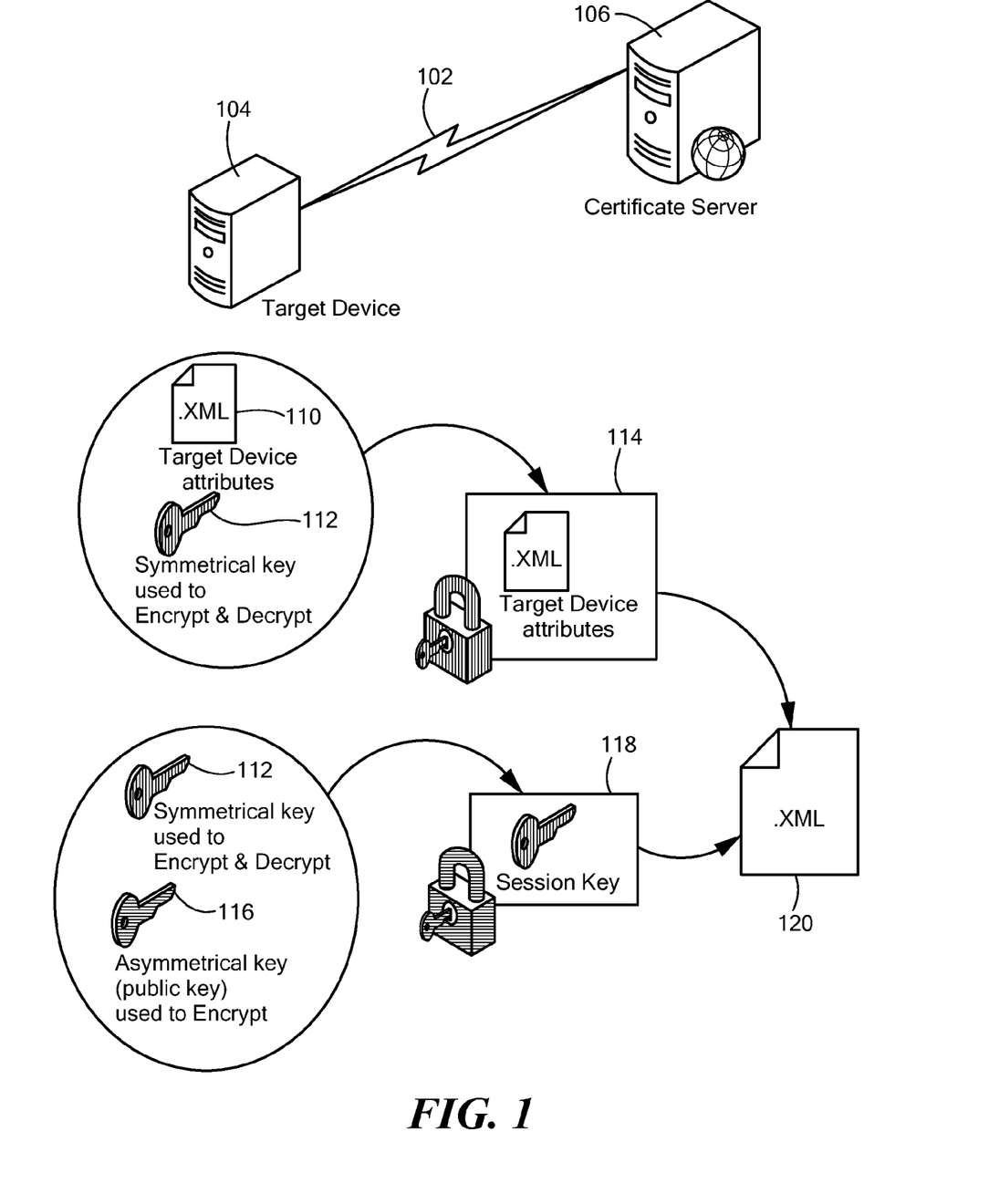
FIG. 1 is a diagram of a process for securely providing system information to a certificate server.

Referring now to FIG. 1, a secure communication link 102 between a target device 104 and a certificate server 106 is illustrated. Target device 104 is a computer system for which system information is collected to contribute to generating a certificate that resides on target device 104. Certificate server 106 is a network server that has access to a database for storing system information for various computer systems, as well as certificates for those computer systems. Certificate server 106 also includes software and/or hardware for analyzing system information from target device 104, for generating a system fingerprint for target device 104 and for generating a certificate that is transmitted to target device 104, as well as stored in a database to which certificate server 106 has access. Secured communication link 102 can be provided as any relatively secure type communication link, including those that employ secure socket layer (SSL) and/or transport layer security (TLS), for example. A user at target device 104 may use secure communication link 102 to access certificate server 106 using a login, such as a user ID and password. According to some embodiments, secure communication link 102 can be an internal connection used in a manufacturing environment. In such an instance, target device 104 may be configured for use with an instrument or other device for a user interface and/or controller. Accordingly, during manufacturing of the instrument, target device 104 may be configured for use with a particular instrument, and uses secure communication link 102 to access certificate server 106 using any desirable protocol, including the secure techniques described above.

Once target device 104 connects with certificate server 106, a selection can be made, for example, by a user or through automation, for an appropriate certificate preparation method for the desired software product that is to be used on target device 104. Once the appropriate certificate preparation configuration is selected, certificate server 106 uses secure communications link 102 to install software on target device 104 that is capable of gathering system information for target device 104. The software for gathering system information can be run from certificate server 106, target device 104, or another computer platform (not shown).

According to some embodiments, the software for gathering system information is loaded on target device 104 and executes to collect system information that can be used to produce a system fingerprint for target device 104. This collection software executing on target device 104 can interrogate the computer hardware and/or software to obtain values that uniquely identify target device 104. Some examples of such information that may uniquely identify target device 104 include processor identifier such as serial number, mainboard identifier such as ID string, chipset information, hard drive identifier such as serial number, MAC address, IP address, computer name, TCP/IP stack fingerprint, operating system configuration such as version number and product key, and other hardware- or software-based values that are specific to target device 104.

Alternatively, or in addition to using target device 104 characteristics in fingerprint generation, the unique fingerprint may be used to identify characteristics of other systems the target device is connected to or other aspects of the network environment of which the target device is a part. This can include characteristics of other devices or systems in the same network, subnet, work group, domain, cluster, enclave, etc., as the target device or characteristics of the network itself. Such characteristics can include, with respect to the non-target devices or systems, processor identifier such as serial number, mainboard identifier such as ID string, chipset information, hard drive identifier such as serial number, MAC address, IP address, computer name, TCP/IP stack fingerprint, operating system configuration such as version number and product key, etc. Further, software modules running on systems within the same network, subnet, work group, domain, cluster, enclave, etc., as the target device can be identified by the certificate analysis utility and polled or otherwise examined for module type or version number, and such software modules may also provide hardware-based or other software-based values for uniquely identifying the respective systems to the utility.

The information obtained by the collection software, in addition to contributing to uniquely identifying target device 104, can also be used to evaluate the hardware of target device 104 for suitability for a software product. The collection software creates a file or document, such as an XML document, to store the collected system information. The various attributes of target device 104 provided in the system information can be tagged in accordance with XML conventions to permit the attributes to be easily referenced in the document.

According to some embodiments, the system information provided in document 110 is intended to be securely delivered to certificate server 106 over secure communication link 102. Additional security can be provided by encrypting document 110 using a symmetrical key 112 prior to delivering document 110 to certificate server 106. Encrypted document 114 may then be stored within another document 120, which may also be arranged as an XML document, for example. Further security can be provided by encrypting symmetrical key 112 using a public key 116 of an asymmetrical public/private key pair.

The encryption of symmetrical key 112 using public key 116 results in session key 118. Session key 118 is added to document 120, which can then be delivered to certificate server 106 via secure communication link 102.

The use of secure communication link 102, symmetrical key 112 and public key 116 to secure and/or encrypt the system information provides additional security for the system information. The additional security helps to obscure the content of document 110, and helps to avoid discovery of the system information that is collected using the collection software. The security measures are thus employed to obscure the system information collection process, as well as contributing to increasing the challenge of reverse engineering the collection process or determining the system information being collected.

With document 120 received at certificate server 106, session key 118 and encrypted document 114 are extracted from document 120. Session key 118 is decrypted using the private key (not shown) associated with public key 116 to obtain symmetrical key 112. Symmetrical key 112 is used to decrypt encrypted document 114 to obtain document 110 containing the system information from target device 104. The system information in document 110 is stored in a database (not shown) accessible by certificate server 106. For example, document 110 may be stored in the database accessible by certificate server 106.

Certificate server 106 analyzes the system information obtained from document 110 and can determine whether the system hardware of target device 104 is appropriate and suitable for the software product that is to be used with target device 104. If the determination is performed and results in the system hardware being deemed appropriate and sufficient for the software product, the system information is further analyzed for unique characteristics that can be selected to generate a system fingerprint. Selected unique characteristics or attributes obtained from the system information, such as described above, are used to form the system fingerprint, which can also be stored in the database accessible to certificate server 106. The system fingerprint may then be used to generate a certificate for target device 104.

Figure 2:
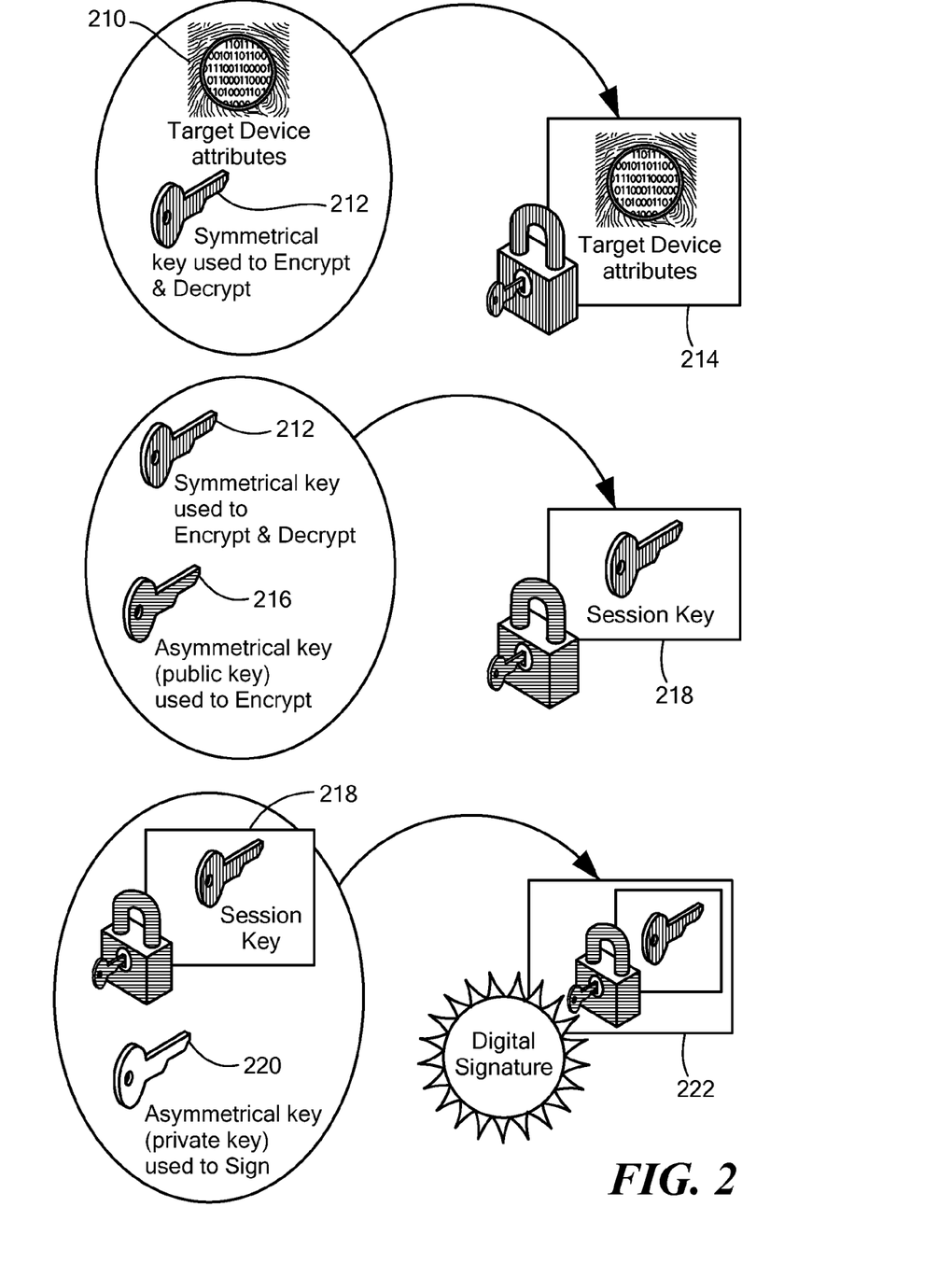
FIG. 2 is a diagram of a process for forming components of a certificate according to the present disclosure.

Referring now to FIG. 2, a diagram for forming components of a certificate are illustrated. A system fingerprint 210, which can be the system fingerprint described above, is encrypted using a symmetrical key 212. Symmetrical key 212 is available from certificate server 106 (FIG. 1), and may be stored for a later use on certificate server 106. Symmetrical key 212 may also be provided on a one time basis in the creation of a unique certificate for target device 104 (FIG. 1), for example. Accordingly, each certificate that is issued by certificate server 106 can include symmetrical key 212 as a unique or reused symmetrical key. Application of symmetrical key 212 to encrypt system fingerprint 210 results in encrypted system fingerprint 214.

Symmetrical key 212 that is used to encrypt system fingerprint 210 is itself encrypted using public key 216, which is part of an asymmetrical public/private key pair. Encryption of symmetrical key 212 using public key 216 results in session key 218. Public key 216 may be stored on certificate server 106, together with an associated private key that forms the asymmetrical public/private key pair. The associated private key can be provided with a software product to contribute to the validation process using the certificate.

Session key 218 is also digitally signed using a private key 220, which is part of an asymmetrical public/private key pair. The digital signature process involving private key 220 and session key 218 is an encryption process that produces a highly unique digital signature 222 that can be used to verify origin of the certificate. Private key 220 is stored on certificate server 106 and kept secret, so that a software product utilizing the certificate in accordance with the present disclosure does not include private key 220. By maintaining private key 220 strictly within or accessible by only certificate server 106, digital signature 222 can provide verification of the source of the certificate. The public key associated with private key 220 as part of the asymmetrical public/private key pair is provided with a software product that accesses the certificate in accordance with the present disclosure to permit verification of the origin of the certificate.

Figure 3:
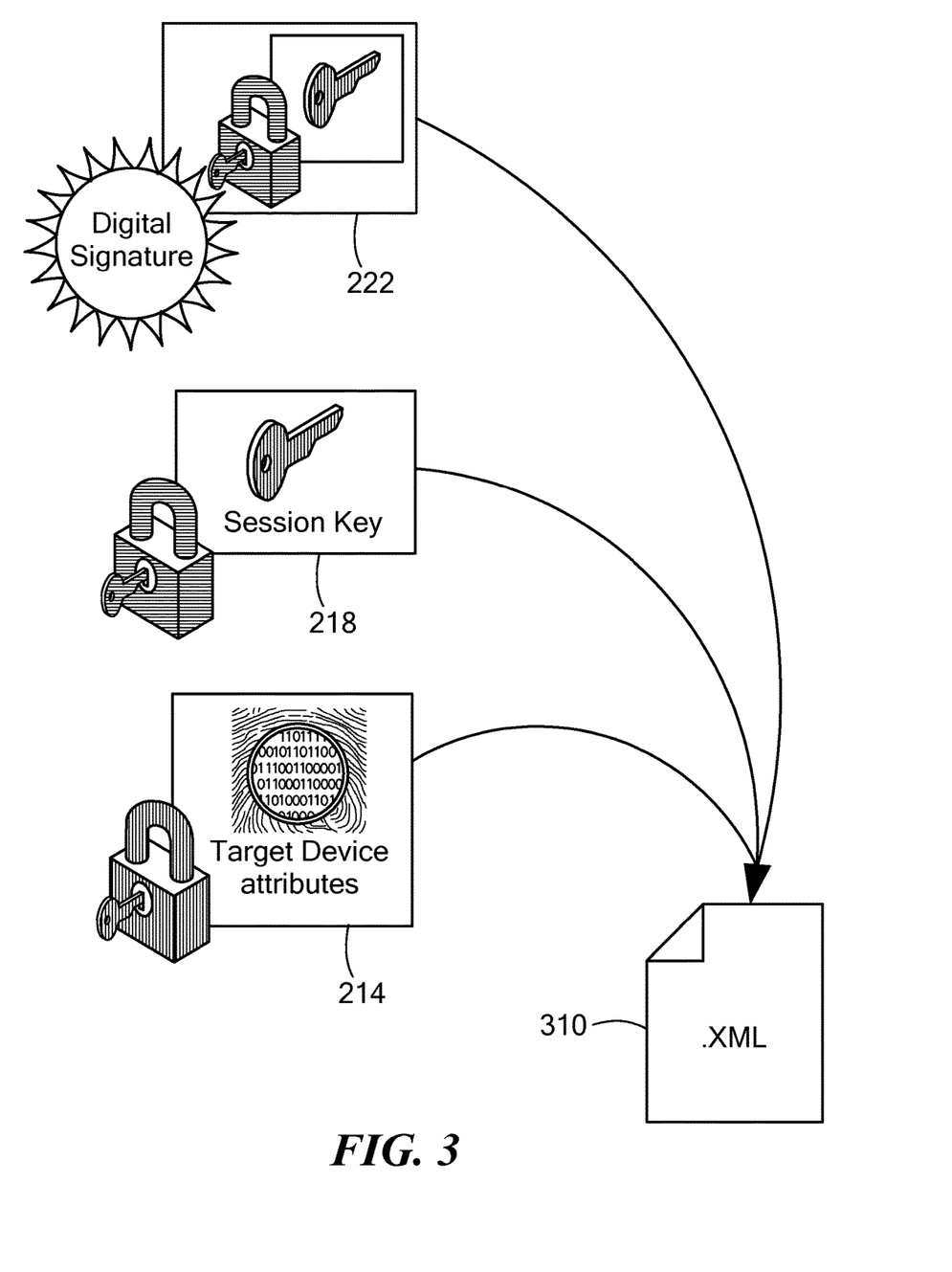
FIG. 3 is a diagram illustrating formation of a certificate according to the present disclosure.

Referring now to FIG. 3, digital signature 222, session key 218 and encrypted system fingerprint 214 are stored in a certificate 310, which may be implemented as an XML document. Referring again to FIG. 1, certificate server 106 provides certificate 310 to target device 104 by a secure communication link 102. With certificate 310 stored on target device 104, secure communication link 102 can be removed, since no further activity between certificate server 106 and target device 104 is needed to use the certificate in accordance with the present disclosure. Certificate server 106 may also store a copy of certificate 310.

According to some embodiments, the collection software provided to target device 104 is used to store certificate 310 in persistent storage for a later access when a software product is being installed, removed and/or executed. The collection software may then be removed from target device 104 and target device 104 can operate on a standalone basis, using the certificate saved in persistent storage for software product use validation.

Figure 4:
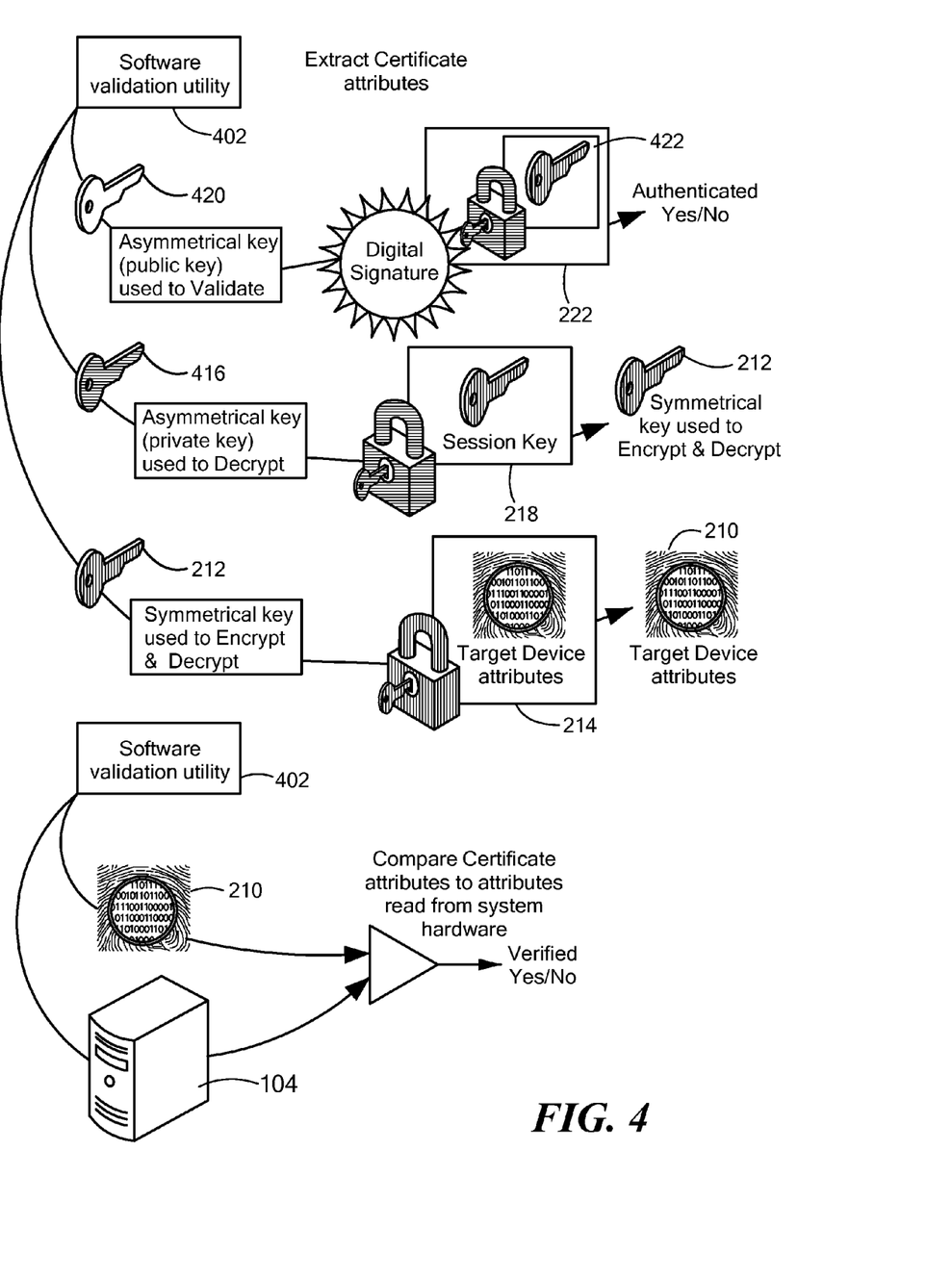
FIG. 4 is a diagram illustrating usage of a certificate to provide anti-piracy protection for software in accordance with the present disclosure.

Referring now to FIG. 4, a process for validating software usage is illustrated. The software usage may refer to software installation, where prior to installation, target device 104 (FIG. 1), for example, is authenticated using the certificate saved on target device 104. Software usage may also refer to execution of the software on target device 104, where the certificate is used to authenticate target device 104 prior to execution of installed software product. Software usage may also refer to de-installation, where prior to removal of a software product, target device 104, for example, is authenticated using the certificate saved to target device 104.

In accordance with an exemplary embodiment of the present disclosure, a software product to be installed on target device 104 includes a validation utility in accordance with the present disclosure to locate and utilize the certificate to authenticate target device 104 prior to installation of the software product. Accordingly, prior to the installation of the software product on target device 104, software validation utility 402 is activated, and attempts to locate a certificate on target device 104. If the certificate is not located, validation utility 402 causes the installation to terminate without installing the software product. If the certificate is located, software validation utility 402 begins the validation process by extracting the components of the certificate. It should be understood that the validation steps may be run in an arbitrary order, however, it may be preferable to validate the certificate with digital signature 222 initially. Accordingly, public key 420, which is available in the software product (not shown), is used to validate digital signature 222. Public key 420 is the counterpart to private key 220 in the same public/private asymmetrical key pair. Public key 420 is thus used to decrypt digital signature 222 that was encrypted with private key 220, to produce a session key 422.

Session key 422 resulting from the decryption of digital signature 222 is compared with session key 218 that is extracted from the certificate. If session key 422 matches session key 218, the digital signature is considered to be authentic, and validates the source of the certificate. If the digital signature is not validated with the comparison of session key 422 and session key 218, e.g., the keys do not match, software validation utility 402 terminates the installation, removal or execution process, thereby preventing the software product being used on target device 104. If digital signature 222 is validated, the validation process concerning digital signature 222 is passed.

A private key 416 that is part of the asymmetrical key pair that includes public key 216 is available in software validation utility 402 in accordance with an exemplary embodiment of the present disclosure. Private key 416 can thus be used to decrypt session key 218 to arrive at symmetrical key 212 that can be used to encrypt and decrypt system fingerprint 210. Private key 416 is unique to software validation utility 402 and the certificate housing session key 218. Private key 416 is the private key portion of the asymmetrical public/private key pair used to encrypt symmetrical key 212 to obtain session key 218 and to decrypt session key 218 to obtain symmetrical key 212.

Symmetrical key 212 may then be applied to decrypt encrypted system fingerprint 214 to obtain system fingerprint 210. Obtaining system fingerprint 210 in accordance with the above-described process provides a relatively high degree of reliability that system fingerprint 210 originated from certificate server 106 and was not copied or otherwise observable in the certificate on target device 104.

Software validation utility 402 can now perform similar operations to those undertaken with the data collection software that originally interrogated the hardware and/or software of target device 104 to obtain the system information, as described above. Again, the system information may be hardware-based, software-based, or some combination of both. Further, as previously described, the system information may be with respect to the target device 104 and/or the network environment thereof.

According to an exemplary embodiment, system fingerprint 210 is an XML document that can be accessed on the basis of tag information, or specified blocks of data. The tags in such an XML document can be used by software validation utility 402 to obtain specific system attributes for target device 104. Software validation utility 402 can interrogate target device 104 to obtain system attributes identified in system fingerprint 210 formatted as an XML document. The system attributes obtained from system fingerprint 210 and from interrogating the hardware and/or software of target device 104 are compared for a match to validate usage of the software product. If the system attributes from system fingerprint 210 match those of target device 104, the software product usage is authorized and software validation utility 402 turns over control of the software product usage to the installation or execution process for the software product.

In creating the certificate 310, certificate server 106 uses several asymmetrical private/public key pairs, e.g., one for the digital signature and one for encrypting/decrypting symmetrical key 212. Certificate server 106 maintains the private key of the asymmetrical public/private key pair used to create or authenticate the digital signature, while software validation utility 402 is furnished with the public key of that asymmetrical public/private key pair. Similarly, certificate server 106 maintains public key 216 of the asymmetrical public/private key pair that includes private key 416, which is furnished to software validation utility 402 to permit decryption of session key 218 to obtain symmetrical key 212. Certificate server 106 maintains private key 220 in secret for use in creating a digital signature, and provides private key 416 with software validation utility 402 to permit certificate 310 to be validated. Accordingly, certificate server 106 maintains the keys and logic to securely create certificate 310, and software validation utility 402 includes the keys and logic used to validate certificate 310.

With the use of an XML document, the system attributes obtained from target device 104 are tagged values, which permits certificate server 106 broad latitude in selecting the attributes that are used to create system fingerprint 210. For example, certificate server may use an internal date and/or time as part of a header information for certificate 310.

These attributes can be provided to software validation utility 402 to contribute to validating certificate 310 by comparing the date and/or time information in certificate 310 again those parameters provided in software validation utility 402.

A specific example of an environment in which the presently disclosed concepts can be practiced includes a database-based system for supporting service operations on laboratory diagnostic equipment. A database server is provided with two network interface cards for connecting to two subnets and communicates with three computer systems. The hardware and/or software characteristics of these computer systems and the respective network connection characteristics are examples of characteristics that can be used to generate a unique fingerprint that, in use, minimizes the possibility of unauthorized uses of software. Such unauthorized uses include the reverse engineering of protected software as well as the execution of protected software on unauthorized hardware devices.

The present disclosure provides a number of advantages over previous approaches, including providing certificate 310 as a standalone document on target device 104 that can be used to validate software installation and/or execution without requiring a connection to certificate server 106. The encryption security provided for certificate 310 and software validation utility 402 helped to ensure that access to a software product is restricted to authorize systems, so that reverse engineering of a software product is highly challenging. The anti-piracy features of the present disclosure thus help to secure software products for authorized computer devices, without placing additional restrictions on users or operators that might be required with prior approaches, such as hardware keys, product keys or personal logins.

Although the present disclosure describes a target device as generally being a computing device, the disclosed systems and methods can be generally implemented with target devices, systems or methods that may not always be thought of in terms of computing devices. Examples of such targets that may employ the presently disclosed systems and/or methods include televisions, mobile phones, automotive vehicles, medical instrumentation, as well as typical targets for software updates such as database applications or embedded systems. In general, the disclosed systems or methods may be applied with any type of processing system that executes software.

The operations herein described are purely exemplary and imply no particular order. Further, the operations can be used in any sequence when appropriate and can be partially used. With the above embodiments in mind, it should be understood that the disclosed systems, devices, methods and/or uses can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described herein that form part of the present disclosure are useful machine operations. The present disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of the present disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the functions described herein may be performed by a processor executing program instructions out of a memory or other storage device. Therefore, it is the object of the appended claims to cover all such variations and modifications as come within the true spirit and scope of the present disclosure.

What is claimed is:

1. A computer implemented system for managing security for a software application provided to the system, comprising:

a processor that is operative to access and execute instructions in a storage memory to:

collect first fingerprint data from the system, the first fingerprint data being related to one or more system specific parameters;

receive and store a certificate in a storage device in the system, the certificate including encrypted second fingerprint data and a first encrypted session key;

decrypt the first encrypted session key using a private key of a first asymmetrical cryptographic key pair to obtain a symmetrical session key, the private key of the first asymmetrical cryptographic key pair being associated with the software application;

decrypt the encrypted second fingerprint data using the symmetrical session key to obtain the second fingerprint data;

compare the first fingerprint data to the second fingerprint data to obtain a software application authorization if the first fingerprint data matches the second fingerprint data;

wherein the second fingerprint data is generated from the one or more system specific parameters;

decrypt a digital signature in the certificate using a public key of a second asymmetrical cryptographic key pair to determine a validity of the certificate, wherein the digital signature is generated by encrypting the session key with a second private key of the second asymmetrical cryptographic key pair;

and install or execute the software application on the system based on the software application authorization and the validity of the certificate.

2. The system according to claim 1, wherein the processor is further operative to:

decrypt the digital signature to obtain a second encrypted session key; and compare the second encrypted session key with the first encrypted session key that is provided in the certificate to determine the validity of the certificate.

3. The system according to claim 1, wherein the first fingerprint data and the second fingerprint data each include one or more characteristics selected from the group consisting of processor identifier, mainboard identifier, chipset information, hard drive identifier, MAC address, IP address, computer name, TCP/IP stack fingerprint, and operating system configuration.

4. The system according to claim 1, wherein the system further comprises additional networked processors and the first fingerprint data and the second fingerprint data each include one or more characteristics selected from the group consisting of processor identifier, mainboard identifier, chipset information, hard drive identifier, MAC address, IP address, computer name, TCP/IP stack fingerprint, and operating system configuration with respect to one or more of the additional networked processors.

5. The system according to claim 1, wherein the certificate comprises:
the first encrypted session key, the first session key being a symmetrical session key and being encrypted using a public key of the first asymmetrical cryptographic key pair; and
the encrypted second fingerprint data being encrypted using the symmetrical session key.

6. The system according to claim 1, wherein the first fingerprint data and the second fingerprint data are each tagged in XML format.

7. A computer implemented system for generating a digital certificate for managing security for a software application provided to a target device, the system comprising:
a processor that is operative to access and execute instructions in a storage memory to:
receive fingerprint data from the target device, the fingerprint data being related to one or more target device specific parameters;
encrypt the fingerprint data using a symmetrical session key;
generate an encrypted session key by encrypting the symmetrical session key using a public key of a first asymmetrical cryptographic key pair;
generate a digital signature by encrypting the encrypted session key using a private key of a second asymmetrical cryptographic key pair;
generate the digital certificate by associating the encrypted fingerprint data, the encrypted session key, and the digital signature into a file; and
send the certificate to the target device,
wherein the digital signature and the fingerprint data permit a validity of the certificate to be determined by the target device before installation or execution of the software application on the target device.

8. The system according to claim 7, wherein the fingerprint data is tagged in XML format.

9. The system according to claim 7, wherein the fingerprint data includes one or more characteristics selected from the group consisting of processor identifier, mainboard identifier, chipset information, hard drive identifier, MAC address, IP address, computer name, TCP/IP stack fingerprint, and operating system configuration.

10. The system according to claim 7, wherein the system further comprises additional networked processors and the fingerprint data includes one or more characteristics selected from the group consisting of processor identifier, mainboard identifier, chipset information, hard drive identifier, MAC address, IP address, computer name, TCP/IP stack fingerprint, and operating system configuration with respect to one or more of the additional networked processors.

11. The system according to claim 7, further comprising:
a database communicatively coupled to the processor for storing the fingerprint data.

12. A computer implemented method for managing security for a software application provided to a target device, comprising:
collecting first fingerprint data from the target device, the first fingerprint data being related to one or more target device specific parameters;
storing a certificate in a storage device in the target device, the certificate including encrypted second fingerprint data and a first encrypted session key;
decrypting the first encrypted session key using a private key of a first asymmetrical cryptographic key pair to obtain a symmetrical session key, the private key being associated with the software application;
decrypting the encrypted second fingerprint data using the symmetrical session key to obtain the second fingerprint data;
comparing the first fingerprint data to the second fingerprint data to obtain a software application authorization if the first fingerprint data matches the second fingerprint data;
wherein the second fingerprint data is generated from the one or more target device specific parameters;
decrypting a digital signature in the certificate using a public key of a second asymmetrical cryptographic key pair to determine a validity of the certificate, wherein the digital signature is generated by encrypting the session key with a second private key of the second asymmetrical cryptographic key pair; and
install or execute the software application on the system based on the software application authorization and the validity of the certificate.

13. The method according to claim 12, further comprising:
decrypting the digital signature to obtain a second encrypted session key; and
comparing the second encrypted session key with the first encrypted session key that is provided in the certificate to determine the validity of the certificate.

14. The method according to claim 12, further comprising:
generating the certificate by:
generating the encrypted second fingerprint data by encrypting the second fingerprint data using the symmetrical session key;
generating the first encrypted session key by encrypting the symmetrical session key using the public key of a first asymmetrical cryptographic key pair; and
storing the encrypted second fingerprint data, the first encrypted session key and the digital signature in the certificate.

15. The method according to claim 12, further comprising:
tagging the first fingerprint data and the second fingerprint data in XML format.

16. The method according to claim 12, wherein the first fingerprint data and the second fingerprint data each include one or more characteristics selected from the group consisting of processor identifier, mainboard identifier, chipset information, hard drive identifier, MAC address, IP address, computer name, TCP/IP stack fingerprint, and operating system configuration.

17. The system according to claim 12, wherein the system further comprises additional networked processors and the first fingerprint data and the second fingerprint data each include one or more characteristics selected from the group consisting of processor identifier, mainboard identifier, chipset information, hard drive identifier, MAC address, IP address, computer name, TCP/IP stack fingerprint, and operating system configuration with respect to one or more of the additional networked processors.

18. The method according to claim 12, further comprising:
   sending the second fingerprint data to a server to prompt generation of the certificate.

19. The method according to claim 18, further comprising:
   generating encrypted second fingerprint data by encrypting the second fingerprint data; and
   sending the encrypted second fingerprint data to the server.

20. The method according to claim 19, further comprising:
   receiving the software application at the target device for processing the second fingerprint data;
   executing the software application to collect the second fingerprint data; and
   removing the software application from the target device.

* * * * *